US011648511B2

United States Patent
Collins et al.

(10) Patent No.: US 11,648,511 B2
(45) Date of Patent: May 16, 2023

(54) METHOD OF CONTROLLING SALINITY OF A LOW SALINITY INJECTION WATER

(71) Applicant: BP Exploration Operating Company Limited, Middlesex (GB)

(72) Inventors: Ian Ralph Collins, Middlesex (GB); John William Couves, Bourne End (GB); John Henry Crouch, Odell (GB); John Dale Williams, Beaconsfield (GB)

(73) Assignee: BP EXPLORATION OPERATING COMPANY LIMITED, Middlesex (GB)

( * ) Notice: Subject to any disclaimer, the term of this patent is extended or adjusted under 35 U.S.C. 154(b) by 294 days.

(21) Appl. No.: 16/645,426

(22) PCT Filed: Sep. 12, 2018

(86) PCT No.: PCT/EP2018/074669
§ 371 (c)(1),
(2) Date: Mar. 6, 2020

(87) PCT Pub. No.: WO2019/053092
PCT Pub. Date: Mar. 21, 2019

(65) Prior Publication Data
US 2020/0230554 A1    Jul. 23, 2020

(30) Foreign Application Priority Data

Sep. 12, 2017 (GB) ..................... 1714649

(51) Int. Cl.
*B01D 61/02* (2006.01)
*B01D 61/08* (2006.01)
(Continued)

(52) U.S. Cl.
CPC ......... *B01D 61/026* (2022.08); *B01D 61/025* (2013.01); *B01D 61/027* (2013.01);
(Continued)

(58) Field of Classification Search
CPC .. B01D 61/022; B01D 61/025; B01D 61/027; B01D 2311/06; B01D 2311/25;
(Continued)

(56) References Cited

U.S. PATENT DOCUMENTS

| 3,637,494 A | 1/1972 | Sullivan |
| 2009/0194478 A1* | 8/2009 | Saveliev ................. C02F 1/441 210/636 |

(Continued)

OTHER PUBLICATIONS

El-Monier, I. A., and Hisham A. Nasr-El-Din. "A study of several environmentally friendly clay stabilizers." SPE Project and Facilities Challenges Conference at METS. OnePetro, 2011. (Year: 2011).*

(Continued)

*Primary Examiner* — Bradley R Spies
(74) *Attorney, Agent, or Firm* — Conley Rose, P.C.

(57) ABSTRACT

A method includes producing a first blended low salinity injection water for injection into at least one injection well that penetrates a first region of an oil-bearing reservoir and producing a second blended low salinity injection water for injection into at least one injection well that penetrates a second region of an oil-bearing reservoir. The reservoir rock of the first and second regions has first and second rock compositions, respectively, that present different risks of formation damage. The first and second blended low salinity injection waters comprise variable amounts of nanofiltration permeate and reverse osmosis permeate. The compositions of the first and second blended low salinity injection waters are maintained within first and second predetermined operating envelopes, respectively, that balance improving enhanced oil recovery from the first and second regions (Continued)

Figure 1:
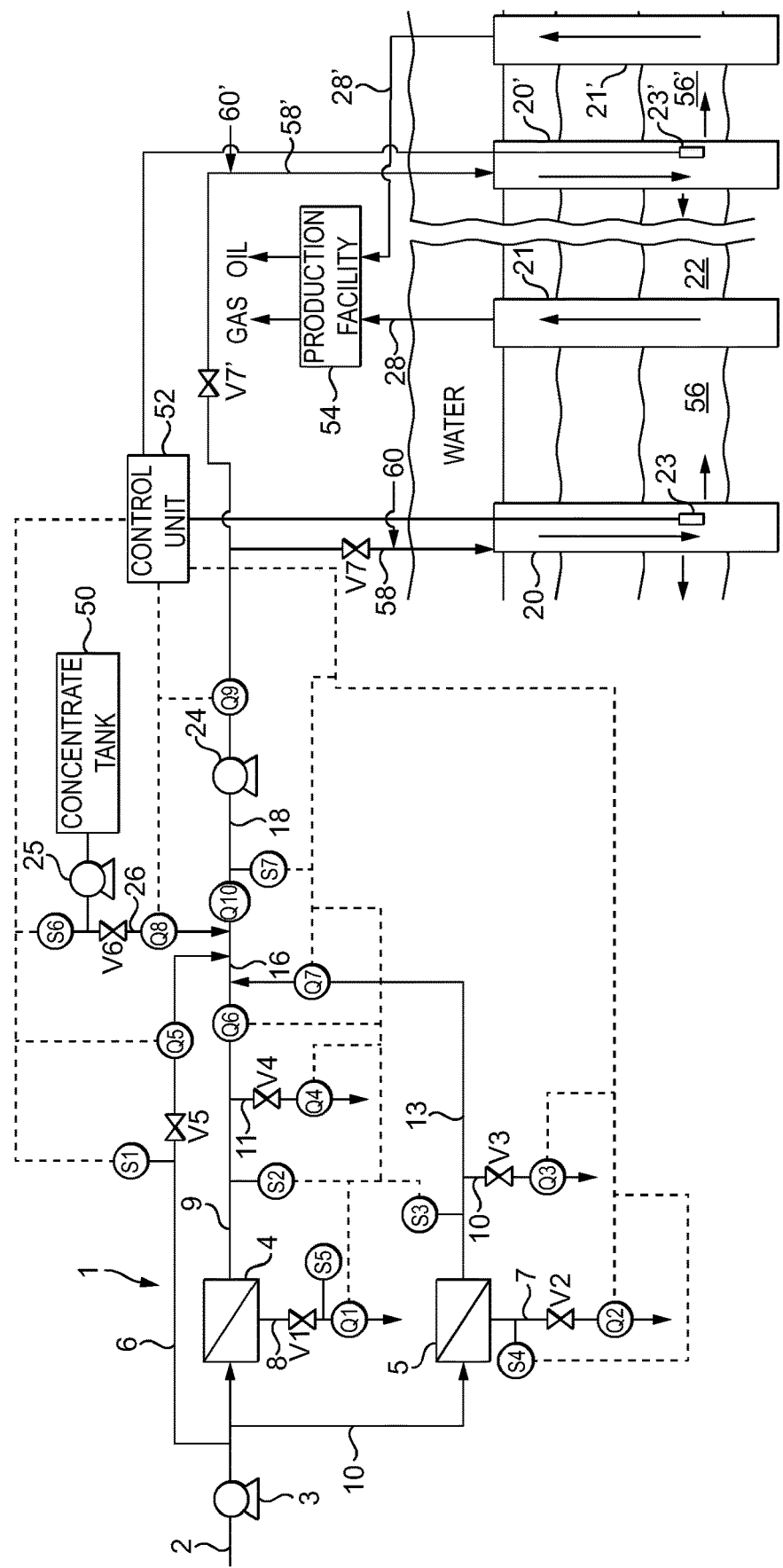

while reducing formation damage upon injecting the first and second blended low salinity injection waters into the oil-bearing reservoir.

36 Claims, 2 Drawing Sheets

(51) Int. Cl.

| | | |
|---|---|---|
| B01D 61/12 | (2006.01) | |
| B01F 23/40 | (2022.01) | |
| C02F 1/44 | (2023.01) | |
| C02F 1/68 | (2023.01) | |
| C09K 8/58 | (2006.01) | |
| E21B 43/20 | (2006.01) | |
| B01F 35/82 | (2022.01) | |
| B01F 101/49 | (2022.01) | |
| C02F 103/08 | (2006.01) | |
| C02F 103/10 | (2006.01) | |

(52) U.S. Cl.
CPC ............ *B01D 61/08* (2013.01); *B01D 61/12* (2013.01); *B01F 23/49* (2022.01); *B01F 35/82* (2022.01); *C02F 1/441* (2013.01); *C02F 1/442* (2013.01); *C02F 1/685* (2013.01); *C09K 8/58* (2013.01); *E21B 43/20* (2013.01); *B01D 2317/04* (2013.01); *B01F 2101/49* (2022.01); *C02F 2103/08* (2013.01); *C02F 2103/10* (2013.01); *C02F 2209/005* (2013.01); *C02F 2209/10* (2013.01); *C02F 2209/29* (2013.01); *C02F 2209/40* (2013.01); *C09K 2208/12* (2013.01)

(58) Field of Classification Search
CPC ...... B01D 2311/251; B01D 2311/2512; B01D 2311/2513; C02F 1/441; C02F 1/442; C09K 8/58

See application file for complete search history.

(56) References Cited

U.S. PATENT DOCUMENTS

| | | | |
|---|---|---|---|
| 2012/0125604 A1 | 5/2012 | Willingham et al. | |
| 2012/0261340 A1* | 10/2012 | Williams | C02F 1/441 |
| | | | 210/295 |
| 2013/0015135 A1* | 1/2013 | Ganzi | C02F 1/4695 |
| | | | 210/259 |
| 2013/0213892 A1 | 8/2013 | Henthorne | |
| 2014/0311980 A1* | 10/2014 | Weston | B01D 61/06 |
| | | | 210/652 |
| 2014/0352958 A1 | 12/2014 | Van Batenburg et al. | |
| 2015/0300149 A1* | 10/2015 | Collins | G05B 17/02 |
| | | | 700/275 |

OTHER PUBLICATIONS

Ochando-Pulido, J. M., G. Hodaifa, and A. Martinez-Ferez. "Permeate recirculation impact on concentration polarization and fouling on RO purification of olive mill wastewater." Desalination 343 (2014): 169-179. (Year: 2014).*

PCT/EP2018/074669 International Search Report and Written Opinion dated Nov. 28, 2018 (18 p.).

* cited by examiner

METHOD OF CONTROLLING SALINITY OF A LOW SALINITY INJECTION WATER

CROSS-REFERENCE TO RELATED APPLICATIONS

This application is a 35 U.S.C. § 371 national stage application of PCT/EP2018/074669 filed Sep. 12, 2018, entitled "Method of Controlling Salinity of a Low Salinity Injection Water," which claims priority to GB Application No. 1714649.9 filed Sep. 12, 2017, and entitled "Method of Controlling Salinity of a Low Salinity Injection Water," each of which is hereby incorporated herein by reference in its entirety for all purposes.

STATEMENT REGARDING FEDERALLY SPONSORED RESEARCH OR DEVELOPMENT

Not applicable.

BACKGROUND

A problem associated with low salinity water-flooding is that desalination techniques may yield water having a lower than optimal salinity for continuous injection into an oil bearing reservoir. Indeed, the desalinated water may be damaging to the oil-bearing rock formation of the reservoir and may inhibit oil recovery, for example, by causing loss of injectivity arising from swelling of clays and migration of fines. Thus, there is an optimal salinity for the injection water that provides the benefit of enhanced oil recovery whilst mitigating the risk of formation damage, and, the optimum salinity may vary within a single reservoir owing to the rock composition varying spatially across a reservoir (both in a vertical and a transverse direction). Typically, where an oil-bearing formation comprises rock that contains high levels of swelling clays, formation damage may be avoided, while still releasing oil from the formation, when the injection water has a total dissolved solids content (TDS) in the range of 200 to 10,000 ppm and the ratio of the concentration of multivalent cations in the low salinity injection water to the concentration of multivalent cations in the connate water of the reservoir is less than 1, for example, less than 0.9.

A further problem associated with low salinity water-flooding is that for reservoirs susceptible to souring or scaling, the sulfate level of the low salinity injection water should typically be controlled to low levels. Souring arises through the proliferation of sulfate reducing bacteria that use sulfate in their metabolic pathway thereby generating hydrogen sulfide. Scaling arises from deposition of mineral scale upon mixing of a sulfate containing injection water with a connate water containing precipitate precursor cations such as barium cations.

Definitions

Throughout the following description the following terms are referred to:

"High salinity feed water" is the feed water for a desalination plant and is typically seawater (SW), estuarine water, aquifer water or mixtures thereof. A "reverse osmosis (RO) filtration unit" comprises a pressure vessel, alternatively called a housing, containing one or more RO membrane elements, preferably, between 1 and 8 RO membrane elements, in particular, between 4 and 8 RO membrane elements.

A "nanofiltration (NF) filtration unit" comprises a pressure vessel containing one or more NF elements, preferably between 1 and 8 membrane elements, in particular, between 4 and 8 NF membrane elements.

A "reverse osmosis (RO) stage of a desalination plant" is a group of RO filtration units connected together in parallel. Similarly, a "nanofiltration (NF) stage of a desalination plant" is a group of NF filtration units connected together in parallel.

A "membrane block" comprises stages of RO and NF filtration connected together to provide concentrate staging and typically shares common valving and piping. A membrane block or two or more membrane blocks may be mounted on a skid.

"Connate water" is the water present in the pore space of an oil-bearing layer of a reservoir.

"Aqueous drive fluid" is an aqueous fluid that may be injected into an injection well after injection of a low pore volume (PV) slug of the blended low salinity injection water.

"Bank of oil" is a term well known to the person skilled in the art and refers to a portion of the layer(s) of reservoir rock where the oil saturation is increased because of the application of an enhanced oil recovery process that targets immobile oil.

"Swept pore volume (PVR)" is the pore volume of the layer(s) of reservoir rock swept by the injected fluids (low salinity injection water and any aqueous drive fluid) between an injection well and production well, averaged over all flow paths between the injection well and production well. Where an injection well has two or more associated production wells, the term "swept pore volume" means the pore volume of the layer(s) of reservoir rock swept by the injected fluids between the injection well and its associated production wells.

"Slug" is a low pore volume of a fluid that is injected into an oil-bearing layer of a reservoir. The values of pore volumes given for the slugs of low salinity injection water are based on the swept pore volume (PVR) of the layer(s) of reservoir rock.

An "injection system" comprises an injection line and one or more injection pumps for pumping injection water through an injection well and injecting the injection water from the injection well into the formation.

"Injectivity" means the relative ease in which a fluid (e.g., an injection water) is injected into an oil-bearing layer of a reservoir.

A "blending system" comprises a plurality of feed lines for feeding blending streams leading to at least one blending point(s) and a discharge line for discharging a blended injection water stream from the blending point(s).

"TDS content" or "TDS concentration" is to the total dissolved solids content of an aqueous stream and typically has units of mg/L (equivalent to ppm). In the case of an aqueous stream in embodiments described herein, the dissolved solids are ions such that the TDS content or TDS concentration is a measure of the salinity of the aqueous stream.

Sodium Adsorption Ratio (SAR) is used to assess the state of flocculation or of dispersion of clays in the reservoir rock. Typically, sodium cations facilitate dispersion of clay particles while calcium and magnesium cations promote their flocculation. A formula for calculating the Sodium Adsorption Ratio (SAR) is:

$$SAR = \frac{Na^+}{\sqrt{\frac{1}{2}(Ca^{2+} + Mg^{2+})}}$$

wherein sodium, calcium, and magnesium concentrations are expressed in milliequivalents/litre.

"Tree" is an assembly of valves, spools and fittings used for a water injection well and may be used to control the flow of water into the injection well.

"Dry" tree (also known as "surface tree") means a tree located at the surface (either on land or on a platform or Floating Production Storage and Offloading facility).

"Wet" tree means a subsea tree located beneath the surface of a body of water, typically, on the seabed.

DETAILED DESCRIPTION

The present invention relates to controlling the salinity of a low salinity injection water during a low salinity waterflood for an oil reservoir when the formation rock surrounding a first injection well has different chemical characteristics to the formation rock surrounding a second injection well resulting in different risks of formation damage (permeability loss) associated with injecting a low salinity injection water from the injection wells into the reservoir. The present invention also relates to controlling the concentration of one or more individual ions or types of individual ions in the low salinity injection water(s) injected into injection wells penetrating different regions of a reservoir where the regions have different rock characteristics associated with different risks of formation damage.

In a first aspect, the present invention relates to a method for producing a first blended low salinity injection water for injection into at least one injection well that penetrates a first region of an oil-bearing reservoir and a second blended low salinity injection water for injection into at least one injection well that penetrates a second region of an oil-bearing reservoir wherein the reservoir rock of the first and second regions has first and second rock compositions respectively that present different risks of formation damage and wherein the first and second blended low salinity injection waters comprise variable amounts of nanofiltration permeate, reverse osmosis permeate and optionally varying amounts of seawater and/or fines stabilizing additive and wherein the compositions of the first and second blended low salinity injection waters are maintained within first and second predetermined operating envelopes respectively that balance improving or maximizing enhanced oil recovery from the first and second regions of the reservoir while reducing or minimizing formation damage upon injecting the first and second blended low salinity injection waters from the injection well(s) into the first and second regions of the oil-bearing reservoir.

The first blended low salinity injection water may be injected into the injection well(s) penetrating the first region of the reservoir and the second blended low salinity injection water may be injected into the injection well(s) penetrating the second region of the reservoir contemporaneously (or concurrently). However, commencement and termination of injection of the first and second low salinity waters into the injection well(s) penetrating the first and second regions respectively of the reservoir need not be contemporaneous.

Alternatively, the first blended low salinity injection water may be injected into the injection well(s) penetrating the first region of the reservoir prior to injecting the second blended low salinity injection water into the injection well(s) penetrating the second region of the reservoir (or vice versa), i.e., successive injection of the first and second blended low salinity injection waters.

It is also envisaged that the oil-bearing reservoir may have one or more further regions (third, fourth etc. regions) that present different risk(s) of formation damage to the first and second regions. Accordingly a further blended low salinity injection water(s) may be injected into at least one injection well penetrating the further region(s) of the reservoir wherein the composition of the further blended low salinity injection water(s) is maintained within a further predetermined operating envelope(s) that balances maximizing enhanced oil recovery from the further region(s) of the reservoir while minimizing the risk of formation damage upon injecting the further blended low salinity injection water from the injection well(s) into the further region(s) of the oil-bearing reservoir.

The further blended low salinity injection waters (third, fourth etc. blended low salinity injection waters) may be injected into the further region(s) (third, fourth etc. regions) of the reservoir contemporaneously or concurrently with injection of the first and second blended low salinity injection waters into the first and second regions of the reservoir. Alternatively, the first, second, and further blended low salinity injection waters (third, fourth etc. blended low salinity injection waters) may be injected successively into the first, second, and further region(s) of the reservoir (in any order).

Preferably, where there is a souring or scaling risk for the reservoir, the operating envelopes for the first, second and any further blended low salinity injection waters may be selected to reduce or minimize the risk of souring or scaling of the reservoir.

In a second aspect, the present invention, relates to a method of producing a single blended low salinity injection water of variable composition for contemporaneous (concurrent) injection into: at least one injection well that penetrates a first region of an oil-bearing reservoir, at least one injection well that penetrates a second region of the oil-bearing reservoir and optionally at least one injection well that penetrates a further region(s) of the oil-bearing reservoir; wherein the reservoir rock of the first, second and further regions has first, second and further rock compositions respectively that present different risks of formation damage and wherein the blended low salinity injection water may comprise variable amounts of nanofiltration permeate, reverse osmosis permeate and optionally variable amounts of seawater and/or of at least one fines stabilizing additive. In this further aspect of the present invention, the single blended low salinity injection water has a composition maintained within an overriding operating envelope defined by boundary values for a region of overlap of predetermined operating envelopes for the compositions of the blended low salinity injection waters for the first, second and optional regions of the reservoir wherein the predetermined operating envelopes balance improving or maximizing enhanced oil recovery from the first, second and optional further regions of the reservoir while reducing or minimizing formation damage in the first, second region and optional further regions of the reservoir.

Preferably, where there is a souring or scaling risk for the reservoir, the overriding operating envelope may be also selected to minimize the risk of souring or scaling of the reservoir.

The different regions (first, second and any further region(s)) of the reservoir may be different regions of a layer of reservoir rock wherein the rock composition varies through the layer. Alternatively, the different regions (first, second and any further region(s)) of the reservoir may be different layers of oil-bearing reservoir rock each having different rock compositions.

A third aspect of the present invention relates to an integrated system for injecting a single blended low salinity injection water of variable composition contemporaneously into at least one injection well penetrating a first region of an oil-bearing reservoir and into at least one injection well penetrating a second region of the oil-bearing reservoir, wherein the integrated system comprises a control unit, a desalination plant, a blending system and an injection system wherein:

- the desalination plant comprises an RO array for producing an RO permeate blending stream and for delivering the RO permeate blending stream to the blending system and an NF array for producing an NF permeate blending stream and for delivering the NF permeate blending stream to the blending system;
- the blending system comprises an RO permeate feed line, an NF permeate feed line, an RO permeate dump line, an NF permeate dump line, a blending point for blending the RO permeate and NF permeate to form the blended low salinity injection water and a discharge line for delivering the blended low salinity injection water to the injection system;
- the injection system comprises an injection line having at least one injection pump for delivering the blended injection water to: (a) the injection well(s) penetrating the first region of an oil-bearing reservoir, (b) the injection well(s) penetrating the second region of the oil-bearing reservoir, and (c) optionally the injection well(s) penetrating one or more further regions of the oil-bearing reservoir;
- wherein the control unit of the desalination plant may change the operation of the desalination plant, in real time, to adjust the amounts of RO permeate and/or NF permeate blending streams that are to be blended at the blending point thereby maintaining the composition of the blended low salinity water stream within an overriding operating envelope defined by boundary values for a region of overlap of first, second and optional further predetermined operating envelope(s) for the composition of the low salinity injection water for the first, second and optional further region(s) of the oil-bearing reservoir respectively wherein the predetermined operating envelopes balance improving or maximizing oil recovery from the first, second and optional further region(s) of the reservoir while reducing or minimizing formation damage in the first, second and optional further region(s) of the reservoir and wherein the predetermined operating windows have been inputted into the control unit and the control unit either determines the overriding operating envelope or the overriding operating envelope has been inputted into the control unit. Preferably, the blending system that produces the single blended low salinity water comprises a tank for a concentrated aqueous solution of at least one fines stabilizing additive (hereinafter "fines stabilizing concentrate") and a fines stabilizing concentrate feed line provided with an adjustable flow control valve that is capable of delivering different amounts of the fines stabilizing concentrate to the blended low salinity injection water. Alternatively, the tank may be provided with a metering pump to accurately dose the fines stabilizing concentrate into the injection water. The metering pump may be linked to a flow rate meter that may be used to adjust the concentration of the fines stabilizing additive to match the concentration profile for the fines stabilizing additive(s). The control unit of the integrated system may change the operation of the blending system, in real time, to adjust the amount of the fines stabilizing concentrate delivered to: the blending point of the blending system or to the injection line thereby maintaining the composition of the resulting single blended low salinity water within an overriding operating envelope that is further defined by boundary values for the concentration of the fines stabilizing additive for a region of overlap of the first, second and any further operating envelopes (for the first, second, and any further regions of the reservoir respectively). Thus, the predetermined operating envelopes for each of the first, second and any further regions of the reservoir include upper and lower limits for the concentration of one or more fines stabilizing additives.

Although the integrated system of this aspect of the present invention is adapted to deliver a single blended low salinity injection water contemporaneously (or concurrently) to injection well(s) penetrating each of the regions, it may be modified to deliver a first blended injection water, a second blended injection water and optionally one or more further blended injection waters successively to at least one injection well penetrating a first region of the reservoir, at least one injection well penetrating a second region of the reservoir and optionally at least one injection well penetrating a further region(s) of the reservoir respectively each region having different risks of formation damage. In this scenario, the operating envelopes for the first, second and any further injection water are inputted into the control unit and the control unit adjusts the composition of the blended low salinity injection water to fall within one of the first, second or further operating envelope(s) thereby forming one of the first, second of further blended low salinity injection waters. The main injection line of the injection system may then be placed in fluid communication with the injection well(s) that penetrate the appropriate region of the reservoir. Thus, if the integrated system is used to form the first blended low salinity injection water, the main injection line is placed in fluid communication with the injection well(s) penetrating the first region of the reservoir. Similarly, if the integrated system is used to form the second injection water or the further injection water(s), the main injection line is placed in fluid communication with the injection well(s) penetrating the second or optional further region(s) of the reservoir respectively. It can be seen that for this modified system, there is no requirement to input an overriding operating envelope into the control unit or for the control unit to determine an overriding operating envelope. Instead, the control unit controls the composition of the blended low salinity injection water to fall within the operating envelope for one of the first, second or further regions of the reservoir.

It is envisaged that the integrated system or modified integrated system of this third aspect of the present invention may be located onshore for use with an onshore reservoir or offshore (e.g., on a platform or FPSO) for use with an offshore reservoir. However, where the integrated system is for use with an offshore reservoir, it is also envisaged that the desalination plant may be located onshore and the RO permeate and NF permeate streams may be delivered to a blending system located offshore.

The integrated system or modified integrated system of this third aspect of the present invention is preferably for use with an offshore reservoir having an injection system comprising a single (main) injection line connected to a single subsea manifold wherein branch injection lines lead from the manifold to the injection well(s) penetrating the first, second and any further region(s) of the oil reservoir.

Where a single blended low salinity injection water having a composition falling within an overriding operating window is to be injected concurrently into each region of the reservoir, the control unit opens valves in the main injection line and the manifold to deliver the injection water from the main injection line concurrently to the injection well(s) penetrating each region of the reservoir. Where first, second and optional further blended low salinity injection waters are to be delivered successively to the first, second and optional region(s) of the reservoir (in any order), the control unit opens and closes valves in the manifold to bring the main injection line into fluid communication with the injection well(s) penetrating one of the first, second and optional regions(s) of the reservoir.

Alternatively, the main injection line may divide to form a first main injection line, a second main injection line and optionally at least one further main injection line leading to a dedicated first manifold, a second manifold and optionally a further manifold(s) for the first region, second region and optional further region(s) of the reservoir respectively wherein the dedicated manifold for each region of the reservoir has branch injection line(s) leading to the injection well(s) penetrating each region. Accordingly, each of the dedicated manifolds may simultaneously deliver an injection water from the main injection line to the injection well(s) penetrating each region of the reservoir. Alternatively, different compositions of low salinity injection water may be delivered successively to one of the first, second and any further dedicated manifolds and from the manifold to the injection well(s) penetrating one of the first, second and any further region of the reservoir.

In a fourth aspect of the present invention there is provided an integrated system for producing a first, second and optionally at least one further blended low salinity injection water each of variable composition for contemporaneous or concurrent injection into: at least one injection well that penetrates a first region of an oil-bearing reservoir, at least one injection well that penetrates a second region of the oil-bearing reservoir and at least one injection well that penetrates any further region(s) of the oil-bearing reservoir; wherein the reservoir rock of the first, second and further region(s) has a first, a second and a further rock composition(s) respectively that present different risks of formation damage and wherein the first, second and further blended low salinity waters may comprise variable amounts of nanofiltration permeate, reverse osmosis permeate and optionally variable amounts of seawater and/or of at least one fines stabilizing additive. In this further aspect of the present invention, each blended low salinity injection water has a composition maintained within a predetermined operating envelope that balances maximizing enhanced oil recovery from each region while minimizing the risk of formation damage in each region. The integrated system comprises a control unit, a desalination plant, a blending system and an injection system wherein:

the desalination plant comprises an RO array for producing an RO permeate blending stream and for delivering the RO permeate blending stream to the blending system and an NF array for producing an NF permeate blending stream and for delivering the NF permeate blending stream to the blending system;

the blending system comprises a main RO permeate feed line, a main NF permeate feed line, an RO permeate dump line, an NF permeate dump line, a first and second blending point and first and second discharge lines wherein the RO and NF dump lines are in fluid communication with the main RO permeate feed line; the main RO permeate feed line divides to form a first and a second branch RO permeate feed line for delivering RO permeate to the first and second blending points respectively, the main NF permeate feed line divides to form a first and a second branch NF permeate feed line for delivering NF permeate to the first and second blending points respectively and the first and second discharge lines are in fluid communication with the first and second blending points and are for delivering the first and second blended low salinity injection waters to the injection system;

the injection system comprises at least a first and a second dedicated injection line each having at least one injection pump wherein the first and second injection lines are in fluid communication with the first and second discharge lines of the blending system respectively, and the first dedicated injection line is for delivering the first blended low salinity injection water to the injection well(s) that penetrate the first region of an oil-bearing reservoir and the second injection line is for delivering the second blended low salinity injection water to the injection well(s) that penetrate the second region of the oil-bearing reservoir;

wherein the control unit of the desalination plant may change the operation of the desalination plant, in real time, to adjust the amounts of RO permeate and/or NF permeate blending streams that are to be blended at the first and second blending points thereby maintaining the compositions of the first and second blended low salinity water streams within first and second predetermined operating envelopes that have been inputted into the control unit.

It is to be understood that the blending system of this further aspect of the present invention may optionally have a further blending point(s), a further RO branch line(s) and a further NF branch line(s) in fluid communication with the further blending point(s) and at least one further discharge line(s) in fluid communication with the further blending point(s) for delivering a further blended low salinity water(s) to a further dedicated injection line(s) of the injection system (having at least one pump) wherein the further dedicated injection line(s) is for delivering a further blended low salinity injection water(s) to the further region(s) of the oil-bearing reservoir and the control unit may change the operation of the desalination plant, in real time, to adjust the amounts of RO permeate and/or NF permeate blending streams that are to be blended at the further blending point(s) thereby maintaining the composition of the further blended low salinity water stream(s) within a further predetermined operating envelope(s) for the further region(s) of the reservoir that has been inputted into the control unit.

Preferably, the blending system comprises a tank for a concentrated aqueous solution of at least one fines stabilizing additive (hereinafter "fines stabilizing concentrate") and a main feed line for the fines stabilizing concentrate having a first, second and optionally further branch feed lines each branch line being provided with a flow control valve wherein the first, second and optional branch feed lines are capable of delivering different amounts of the fines stabilizing concentrate as a blending stream for the first, second and further blended low salinity injection waters. For example, the first, second and a further branch line(s) may deliver fines stabilizing concentrate to:
  (a) the first, second and further blending point(s) of the blending system respectively;
  (b) to injection points located in the first, second and the optional further dedicated injection lines of the injection system respectively; or
  (c) to chemical injection points of the trees of the injection well(s) penetrating the first region, second region and optional further region(s) of the oil-bearing reservoir respectively.

The control unit of the integrated system may change the operation of the blending system, in real time, to adjust the amount of the fines stabilizing concentrate delivered as a blending stream for the first, second and any further blended low salinity injection waters thereby maintaining the compositions of the blended low salinity water streams within predetermined operating envelopes that include boundary values for at least one fines stabilizing additive.

The integrated system of this aspect of the present invention may be located onshore for use with an onshore oil reservoir or may be located offshore (on a platform or FPSO) for use with an offshore oil reservoir. It is also envisaged that the desalination plant of the integrated system of this aspect of the present invention may be located onshore and the blending system may be located offshore with the onshore desalination plant delivering RO permeate and NF feed streams (via RO and NF permeate feed lines respectively) to the offshore blending system.

Where the integrated system of this aspect of the present invention is located onshore for use with an onshore oil reservoir there is no difficulty with injection of the first, second or further blended low salinity injection waters into the injection well(s) penetrating the first, second and optional further region(s) of the reservoir as the injection wells all have dry trees.

Where either the entire integrated system or the blending system of the integrated system is located offshore, the injection wells penetrating the first, second and optionally the further region(s) of the reservoir may have dry trees located on the platform or FPSO thereby enabling different compositions of low salinity water to be injected into the injection well(s) penetrating the first, second and optionally the further region(s) of the reservoir. Thus, the injection wells may be essentially extended from the seabed to the platform or FPSO. Alternatively, the injection well(s) penetrating the first, second and optional further region(s) of the reservoir may have wet trees with the dedicated first, second and optional further water injection lines extending from the platform or FPSO to the seabed. Typically, the dedicated first, second and optional further water injection lines may be connected to first, second and optional further subsea manifolds wherein each manifold has one or more branch injection lines connected to the wet tree(s) of the injection well(s) that penetrate each region of the reservoir (i.e., there is a dedicated water injection line and a dedicated manifold for the injection well(s) of each region of the reservoir).

The injection well(s) penetrating the first region of the reservoir may be in fluid communication with the first dedicated water injection line such that opening of a valve in the tree(s) of the injection well(s) allows the first blended low salinity injection water to flow from the dedicated first water injection line into the injection well(s) penetrating the first region of the reservoir. Similarly, the tree(s) of the injection well(s) penetrating the second region (or any further region) of the reservoir may be in fluid communication with the second dedicated water injection line (or any further dedicated injection line) such that opening of a valve in the tree(s) allows the second blended low salinity injection water to flow from the second dedicated water injection line into the injection well(s) penetrating the second region of the reservoir (or any further injection water(s) to flow from the further dedicated water injection line(s) into the injection well(s) penetrating the further region(s) of the reservoir).

The control unit of the integrated systems of the present invention may include a CPU (Central Processing Unit), a RAM (Random Access Memory), a ROM (Read Only Memory), a HDD (Hard Disk Drive), I/F (Interfaces), computer-executable code (e.g., software and/or firmware), and the like. The control unit can store instructions in the memory, where the instructions can be executed on the processor to configure the processor to perform any of the functions or actions described with respect to or attributed to the control unit according to the instructions stored in the memory. While described as including a processor and memory, in some aspects, an application specific integrated circuit (ASIC) can be developed to perform the same functions.

Boundary values for the compositions of the first, second and any further blended low salinity injection waters for each region of the oil reservoir may be inputted into the control unit of the integrated system. The control unit may then determine operating envelopes for the composition of the blended low salinity injection water for each region of the reservoir where the operating envelopes are defined by the boundary values. However, it is also envisaged that the operating envelopes may be determined by inputting the boundary values into a computer situated at a remote location, outputting the operating envelopes and transmitting the outputted operating envelopes to the control unit of the integrated system via a network. The operating envelopes may be defined by boundary values (upper and lower limits) for parameters including one or more of: the TDS content (salinity), ionic strength, the concentrations of individual ions (such as sulfate anions, nitrate anions, calcium cations or magnesium cations), the concentrations of types of individual ions (such as monovalent cations, monovalent anions, multivalent anions, multivalent cations, or divalent cations) ratios of types of individual ions, ratios of individual ions (such as Sodium Adsorption Ratio), or any combination thereof.

Compositions within the operating envelope for a region of the reservoir are those predicted to achieve enhanced oil recovery (EOR) from each region of the reservoir while avoiding, reducing, or minimizing the risk of formation damage in the region of the reservoir.

Where there is a souring risk or scaling risk for the reservoir, compositions within the operating envelope for a region (i.e., first, second and any further region(s)) of the reservoir are preferably those that are also predicted to mitigate reservoir souring or inhibit scaling. The person skilled in the art will understand that not all reservoirs present a souring risk or a scaling risk. Thus, souring may occur when a reservoir contains an indigenous population of sulfate reducing bacteria that obtain energy by oxidizing organic compounds while reducing sulfate to hydrogen sulfide. Scaling may occur when a connate water containing high levels of precipitate precursor cations such as barium and strontium cations mixes with an injection water containing relatively high amounts of sulfate anions resulting in the precipitation of insoluble sulfate salts (mineral scales).

It is envisaged that each region of the reservoir may have a plurality of different operating envelopes defined by different boundary values for each parameter where the different operating envelopes balance different levels of enhanced oil recovery (EOR) with different levels of risk of formation damage for each region of the reservoir. The plurality of operating envelopes for each region of the reservoir may also take into account the risk of souring or scaling of the reservoir. The plurality of different operating envelopes for the composition of the blended low salinity injection water for each region (first, second and any further region(s)) of the reservoir may be inputted into the control unit.

In order to maintain the compositions of the first, second and any further blended low salinity waters within the predetermined (predefined) operating windows for the first, second and any further regions of the reservoir or to maintain the composition of a single blended low salinity injection water within an overriding operating envelope for these regions, the amounts of NF permeate and RO permeate that are blended to produce the blended low salinity water stream(s) may be adjusted in real time in response to a decrease in injectivity in one or more of the regions of the reservoir.

In the blending system of the integrated system of the present invention, the amount of the NF permeate stream or of the RO permeate available for blending to form the blended low salinity injection water stream(s) may be rapidly adjusted (in real time) by discharging varying amounts of the NF permeate stream or RO permeate stream from the desalination plant, for example, into a body of water (the ocean), via an NF permeate or RO permeate "dump line" respectively that are each provided with a "dump valve". The dump valve is an adjustable valve (e.g., a throttle valve) that may be set to various positions (between a fully closed and fully open position) to adjust the amounts of NF permeate or RO permeate discharged from the blending system.

If the discharge of excess NF permeate or excess RO permeate continues for a prolonged period of time, for example, hours or days, then the control unit may make adjustments to the desalination plant by taking one or more of the NF units of the array or one or more of the RO units of the RO array off-line thereby reducing the production capacity of NF permeate or RO permeate respectively. If, the discharge of excess NF permeate or RO permeate continues for weeks or months, optionally, the NF elements of one or more of the NF units of the desalination plant may be replaced by RO elements or the RO elements of one or more of the RO units may be replaced by NF elements to increase the amounts of RO permeate or of NF permeate produced by the desalination plant.

It is known that divalent cations may be beneficial for stabilizing reservoir rock that has the potential to release fines, and thus, can function as fines stabilizing additives. In general, "fines" can include clay particles and silica particles. Optionally, the desalination plant may have a by-pass line for the high salinity water used as feed to the RO and NF arrays of the plant as this high salinity feed water, for example, seawater (SW) typically contains high levels of divalent cations. This by-pass line is used for delivering a high salinity water blending stream (for example, a SW blending stream) to the blending system. Accordingly, the blending system optionally has a high salinity water (e.g., SW) feed line.

Where the blending system produces a single blended low salinity injection water of variable composition, the by-pass line for the high salinity feed water may be provided with an adjustable valve (e.g., a throttle valve) that may be set to various positions between a fully closed and fully open position thereby providing variable amounts of high salinity water (e.g. SW) for blending with the RO permeate blending stream, and NF permeate blending stream (or a combined RO/NF permeate blending stream) to form the single blended low salinity injection water(s). However, if desired, any excess high salinity water may also be dumped overboard via a high salinity water dump line provided with an adjustable valve (e.g. a throttle valve). The use of an adjustable valve on the optional SW by-pass line (or of a SW dump line provided with an adjustable valve) also allows for rapid adjustments (in real time) to the TDS, concentration of one or more individual ions to the composition(s) of the blended low salinity injection water stream(s).

Where the blending system produces first, second and optionally one or more further blended low salinity injection waters, the high salinity water by-pass line may be provided with first and second branch lines and optionally one or more further branch lines each provided with an adjustable valve (e.g. throttle valve) for providing variable amounts of high salinity water to blending points for forming the first, second and any further blended low salinity injection waters.

The control unit may therefore alter the amount of any high salinity water (e.g. SW) included in the blended low salinity injection water stream(s) in response to changes in injectivity in one or more of the first, second or any further regions of the reservoir to move the composition(s) of the blended low salinity water stream(s) to within preferred predetermined (preselected) operating envelope(s) (or a preferred overriding envelope) where there is less risk of formation damage. The person skilled in the art will understand that SW contains high level of sulfate anions. Accordingly, when blending an RO permeate blending stream, and an NF permeate blending stream with a SW blending stream, the souring risk (and scaling risk) for the reservoir must be rigorously managed. The souring risk or scaling risk for a reservoir may be managed by inputting into the control unit an upper limit (boundary value) for the sulfate concentration of the blended low salinity injection water(s) of typically 100 mg/L; preferably, 50 mg/L, and in particular, 40 mg/L.

The blending system of the integrated system may optionally comprise a tank (for storing a concentrate comprising an aqueous solution or dispersion of one or more fines stabilizing additives) and a main concentrate feed line. Where the blending system produces a single low salinity injection water, the concentrate feed line may be provided with a throttle valve for delivering variable amounts of a concentrate blending stream comprising the aqueous solution or dispersion of one or more fines stabilizing additives to a blending point for the low salinity injection water stream. Thus, the adjustable valve may be set to various positions between a fully closed and fully open position thereby providing variable amounts of concentrate to the blending point. Alternatively, the main concentrate feed line may divide to form first, second and optionally further branch concentrate feed lines, each provided with an adjustable valve (e.g. a throttle valve) for delivering variable amounts of the concentrate blending stream to blending points for forming first, second and optionally further low salinity injection waters. Thus, the controller may maintain the compositions of the first, second and any further blended low salinity injection waters within predetermined operating envelopes (or the composition of the single blended low salinity injection water within an overriding operating envelope) further defined by boundary values (upper and lower limits) for the concentration(s) of the fines stabilizing additive(s). The control unit may monitor the flow rate of the concentrate in the main concentrate fee line or the flow rates of the concentrate streams in the branch concentrate feed lines in real time and may make rapid adjustments to the flow rates of the concentrate using the adjustable valve(s) thereby changing the concentration of the one or more fines stabilizing additives in the blended injection water stream(s).

The fines stabilizing additive(s) may be an inorganic salt such as a salt of a divalent cation or a potassium salt. Preferably, the salt of the divalent cation may be a calcium salt such as calcium chloride, calcium bromide or calcium nitrate, preferably, calcium chloride or calcium nitrate. Calcium nitrate also has the advantage of providing souring control as the nitrate anion may encourage the growth of nitrate reducing bacteria that may out-compete SRB for nutrients and assimilable organic carbon. Preferably, the potassium salt is selected from potassium chloride, potassium bromide and potassium nitrate. Potassium nitrate has the advantage that it may also provide souring control.

The control unit may automatically adjust the operation of the blending system and, hence, the amounts of the RO permeate stream, NF permeate stream (and of any optional high salinity water stream such as SW or optional fines stabilizer concentrate stream) that are included in the blended low salinity injection water stream(s) in response to changes in injectivity in one or more of the regions of the reservoir.

Where the blending system produces a single low salinity injection water stream, the flow rate and composition of the blended low salinity injection water may be monitored in real time to determine whether changes made by the control unit to the operation of the blending system to maintain the composition of the single blended low salinity injection water within the overriding operating envelope are effective. Where the blending system produces a first, second and optionally one or more further low salinity injection waters, the flow rates and compositions of the blended low salinity injection waters may be monitored in real time to determine whether changes made by the control units to the operation of the blending system maintain the compositions of the first, second and any further low salinity injection waters within the first, second and any further predetermined operating envelopes respectively are effective. If not, the control unit may make further changes to the operation of the blending system. Accordingly, the control unit has a feedback loop for controlling blending of the blended low salinity water stream(s).

Controlling the amounts of RO permeate and NF permeate that are available for blending in real time by changing the amounts of RO permeate or NF permeate discharged from the blending system via an RO permeate or NF permeate dump line, for example, into a body of water (e.g., the ocean), provides a robust control of TDS and/or of the concentrations of the one or more individual ions within the operating envelope(s) for the blended low salinity injection water stream(s). Thus, there is a faster response than if an attempt was made to change the flow rates of feed water to the RO and NF arrays of the desalination plant (owing to the dead volumes in the feed lines leading from the RO and NF arrays to the blending point(s) for the blended low salinity injection water stream(s)).

Further, where a high salinity water (e.g., SW) or a fines stabilizing concentrate is available as a blending stream, controlling the degree of opening of the adjustable (variable) valves (e.g., throttle valves) on the high salinity water by-pass line or on the main fines stabilizing concentrate line may adjust the composition of the single blended low salinity injection water to fall within a preferred overriding operating envelope in response to changes in injectivity in the injection well(s) penetrating the first, second or any further regions of the reservoir.

Similarly, controlling the degree of opening of the adjustable (variable) valves (e.g., throttle valves) on the branch SW feed lines (and/or controlling the degree of opening of the adjustable valves (e.g., throttle valves) on the concentrate feed branch lines may adjust the compositions of the first, second and any further blended low salinity injection waters to fall within preferred predetermined operating envelopes in response to changes in injectivity in the injection well(s) penetrating the first, second or any further regions of the reservoir.

It can therefore be seen that the control unit may alter the operation of the desalination plant in real time by adjusting one of more of the opening degree of the valve on the RO permeate dump line, the opening degree of the valve on the NF dump valve, the opening degree of the valve on the optional high salinity water by-pass line (or the opening degree of a valve on one or more of the high salinity feed branch lines), and the opening degree of the valve on the optional main fines stabilizing concentrate line (or the opening degree of a valve on one or more of the fines stabilizing concentrate branch lines).

Various probes (sensors) may be included in the integrated system of the present invention, in particular, in the blending system. These probes may be used to determine the TDS and/or ionic composition of the blended low salinity injection water stream(s). For example, the TDS of the blended low salinity injection water stream(s) may be determined from its conductivity, while the concentrations of individual ions or types of individual ions may be determined using glass probes having membranes that are permeable to specific individual ions or types of individual ions. Similarly, probes (sensors) may be present on the RO and NF permeate lines, any combined RO/NF permeate line (where a combined RO/NF permeate stream is optionally blended with SW or fines stabilizing concentrate to form a blended low salinity injection water), and the optional high salinity water by-pass line to obtain data relating to the TDS and ionic composition of the RO permeate stream, NF permeate stream, the optional high salinity water stream (and of any combined RO/NF permeate stream). Flow rate sensors may also be provided on flow lines for determining the flow rates of the various blending streams (RO permeate stream(s), NF permeate stream(s), the optional high salinity feed water stream(s), any combined RO/NF permeate stream(s) and the optional fines stabilizing concentrate stream(s)) and for determining the flow rates of RO permeate in the RO dump line and NF permeate in the NF dump line.

Accordingly, the blending system may have:
(a) Ion concentration sensors for measuring the salinity or total concentration of dissolved solids (Ct), concentrations of individual ions (Ci) or types of individual ions in the RO permeate blending stream(s), NF permeate blending stream(s), any combined RO/NF permeate blending stream(s), and optional SW blending stream(s), optional fines stabilizing concentrate blending stream(s), and the blended low salinity injection water stream(s). In particular, the blending system may have ion concentration sensors for measuring at least one of TDS concentration, chloride anion concentration, bromide anion concentration, calcium cation concentration, magnesium cation concentration, potassium cation concentration, nitrate anion concentration and sulfate anion concentration for the RO permeate blending stream(s), NF permeate blending stream(s), any combined RO/NF permeate blending stream(s), and optional high salinity water blending stream(s).
(b) Flow rate sensors for measuring the flow rates of one or more of: the RO permeate blending stream(s), the RO permeate dump stream, the NF permeate blending stream(s), the NF permeate dump stream, any combined RO/NF permeate blending stream(s), the optional high salinity water by-pass stream(s), the optional fines stabilizing concentrate stream(s) and the blended low salinity injection water stream(s).

The ion concentration sensors, the flow rate sensors, and any other sensors described herein may communicate with the control unit through any suitable communication technology, such as a direct electrical connection or wireless electrical connection (e.g., Wi-Fi, Bluetooth).

Owing to the risk of formation damage during a low salinity water flood, a maximum permitted increase in downhole pressure for the injection well(s) penetrating the first, second and any further regions of the reservoir may be inputted into the control unit. Where dedicated injection line(s) are used for delivering first, second and further injection waters to the injection well(s) penetrating the first, second and any further regions of the reservoir, a maximum permitted reduction in flow rate for each injection water stream downstream of the injection pump(s) on each dedicated flow line may be inputted into the control unit (beyond which there is an unacceptable reduction in injectivity). Both an increase in downhole pressure in an injection well penetrating one of the regions of the reservoir and a decrease in flow rate downstream of the injection pump(s) of the dedicated flow lines are indicative of loss of injectivity arising from formation damage in one of the regions of the reservoir.

The downhole pressure in the injection well(s) adjacent the oil-bearing layer in each region of the reservoir (or the flow rate of the blended low salinity injection water downstream of the injection pump(s) for dedicated injection lines of the injection system) may be monitored in real time. The pressure in the injection well(s) may be monitored with a downhole measurement device such as a pressure sensor that is linked to the control unit, for example, via a fibre optic telemetry line or any other suitable communication technology.

If the control unit determines there is a decline in injectivity for the injection well(s) penetrating one or more of the regions of the reservoir, the control unit may select a different operating envelope (or different overriding operating envelope) for the composition of the blended injection water stream(s) that is predicted to have a lower risk of causing formation damage (while maintaining an acceptable level of EOR from the region(s) of the reservoir) and may then adjust the blending ratios of the various blending streams such that the composition of the blended low salinity injection water injected into the injection well(s) penetrating the region(s) of the reservoir falls within the different operating envelope(s) (or different overriding operating envelope). The control unit continues to monitor the downhole pressure in the injection well(s) penetrating the region(s) of the reservoir where there has been a decline in injectivity (or the flow rate downstream of the injection pump(s) for the dedicated injection lines leading to the injection well(s) penetrating the region(s) of the reservoir where there has been a decline in injectivity) in real time to determine if the pressure (or flow rate) begins to stabilize in response to injection of a blended low salinity injection water having a composition within the preferred operating window (or preferred overriding operating envelope). If not, the control unit may make further changes to the operation of the blending system to adjust the composition of the blended low salinity injection water stream(s) to fall within yet another preferred operating envelope (or preferred overriding operating envelope) that is predicted to have yet a lower risk of causing formation damage. This process is iterative and may be repeated many times. Optionally, the control unit may take a decision to reduce the flow rate of low salinity injection water or stop injecting low salinity injection water into the injection well(s) of one or more regions of the reservoir if the pressure continues to rise. The control unit may then take the decision to inject a fines stabilizing composition (e.g., the undiluted fines stabilizing concentrate) into the oil-bearing layer(s) of the region(s) of the reservoir, where there has been a decline of injectivity, for a period of several days before recommencing the low salinity waterflood.

Typically, correlations are inputted into the control unit between the mixing ratios of the various blending streams and the compositions of the first, second and any further blended low salinity injection water streams or the composition of the single injection water stream (for example, correlations between the mixing ratios of the various blending streams and one or more of the TDS, osmotic strength, concentrations of individual ions, concentrations of types of individual ions, ratios of individual ions and ratios of types of individual ions of the blended low salinity injection water stream). These correlations may be based on the assumption that the compositions for the NF permeate, RO permeate and optional high salinity water (e.g. SW) blending stream remain substantially constant (within predetermined tolerances) during operation of the desalination plant. The mixing ratios of the various blending streams are dependent upon the flow rates of the various blending streams that are supplied to the blending point(s) of the blending system to form the first, second and further blended low salinity injection water streams or the single low salinity water stream.

Correlations may also be inputted into the control unit between the opening degree of the NF dump valve, the opening degree of the RO dump valve, the opening degree of the adjustable valve(s) on the optional main high salinity water feed line or the high salinity water branch lines and the opening degree of the adjustable valve(s) on the optional main fines stabilizing concentrate line or the fines stabilizing concentrate branch lines and the flow rates of NF permeate, RO permeate, optional high salinity water and optional fines stabilizing concentrate blending streams. The control unit may therefore control the blending ratios and hence the compositions of the single blended low salinity injection water or the first, second and further blended low salinity injection water streams by changing the opening degrees of one or more of the above-identified adjustable valves to achieve compositions for the single blended low salinity injection water or the first, second and further blended low salinity injection waters within the predefined (preselected or predetermined) overriding operating envelope of the predetermined operating envelopes for the first, second and any further regions of the reservoir. As a result, the flow rates of the various blending streams to be supplied to the mixing point(s) may be adjusted in real time thereby ensuring the compositions of the single blended low salinity injection water lies within the overriding operating envelope or the compositions of the first, second and any further low salinity waters lie within the predefined operating envelopes for the first, second and any further regions of the reservoir.

Typically, the boundary values for the TDS of the blended low salinity injection water stream(s) may be in the range of 200 to 10,000 mg/L, preferably 500 to 10,000 mg/L. Generally, lower TDS ranges provide higher EOR while higher TDS ranges mitigate the risk of formation damage, especially in reservoirs comprising rocks with high levels of swellable clays and/or migratable fines such as clay particles and silica particles. Alternative boundary values for the TDS may be, for example, in the range of 500 to 5,000 mg/L, 500 to 3,000 mg/L, 1,000 to 2,000 mg/L, 2000 to 5000 mg/L, or 3000 to 7000 mg/L (depending on the risk of formation damage). The control unit may control the compositions of the first, second and any further blended low salinity injection waters for the first, second and any further regions of the reservoir to within a selected range for the boundary values for the TDS.

Where there is a souring risk or scaling risk for the reservoir, the control unit controls the sulfate anion concentration of the first, second and any further blended low salinity injection waters for the first, second and further regions of the reservoir (or the sulfate anion concentration of the single blended low salinity injection water) to a value of less than 100 mg/L, preferably, less than 50 mg/L, most preferably, less than 40 mg/L.

Typically, the control unit controls the total multivalent cation concentration of the first, second and any further blended injection waters for the first, second and any further region of the reservoir (or the multivalent cation concentration of the single blended low salinity injection water) to within the range of 1 to 250 mg/L, preferably, 3 to 150 mg/L, in particular, 50 to 150 mg/L with the proviso that the ratio of the multivalent cation content of the blended low salinity injection water(s) to the multivalent cation content of the connate water contained in the pore space of the reservoir rock for each region of the reservoir is less than 1. Typically, the control unit controls the calcium cation concentration of the first, second and any further blended injection waters for the first, second and any further region of the reservoir (or the calcium cation concentration of the single blended low salinity injection water) to within the range of 1 to 200 mg/L, preferably 5 to 150 mg/L, in particular, 50 to 150 mg/L, with the proviso that the ratio of the calcium cation content of the blended low salinity injection water(s) to the calcium cation content of the connate water contained in the pore space of the reservoir rock of each region of the reservoir is less than 1.

Typically, the control unit controls the magnesium cation concentration of the first, second and any further blended injection waters for the first, second and any further region of the reservoir (or the multivalent cation concentration of the single blended low salinity injection water) to within the range of 2 to 400 mg/L, preferably 10 to 300 mg/L, in particular, 100 to 300 mg/L, with the proviso that the magnesium cation content of the blended low salinity injection water(s) to the magnesium cation content of the connate water contained in the pore space of each region of the reservoir is less than 1.

Typically, the control unit controls the potassium cation concentration of the first, second and any further blended injection waters for the first, second and any further region of the reservoir (or the multivalent cation concentration of the single blended low salinity injection water) to within the range of 10 to 2000 mg/L, in particular, 250 to 1000 mg/L, with the proviso that the TDS of the blended low salinity injection water(s) remains within the boundary values for the predefined operating envelope.

Alternatively, the control unit may control the composition of the single blended low salinity injection water within a selected range defined by boundary values for the TDS (and within selected ranges defined by boundary values for multivalent cation content, calcium cation content, magnesium cation content and potassium cations content) for a region of overlap of the boundary values for the TDS (and for a region of overlap of the boundary values for multivalent cation content, calcium cation content, magnesium cation content and potassium cations content) for the first, second and any further regions of the reservoir.

The boundary values for the TDS and concentrations of individual ions and the concentration of any fines stabilizing additive for the first, second and any further blended low salinity injection water may vary depending on the low salinity EOR response for each region of the reservoir and the composition of the rock of the oil-bearing layer(s) of each region of the reservoir, and in particular, on the levels of swellable and migratable clays and minerals that are known to be linked to formation damage.

The boundary values may have been determined by analysing samples of reservoir rock taken from each region of the oil-bearing layer of the reservoir. The samples of the reservoir rock may be rock cuttings, or a side wall core. Alternatively, the reservoir rock surrounding an injection wellbore may be analysed by geophysical logging using a downhole logging apparatus. Analysis of the rock for each region of the oil-bearing layer of the reservoir may include, but is not limited to determining the whole rock clay content for reservoir rock surrounding the injection wellbore(s) in the first, second and any further regions of the reservoir. The whole rock clay content of the reservoir rock for the first, second and any further regions of the reservoir may be determined by geophysical logging, X-ray diffraction (XRD), scanning electron microscopy (SEM), infrared scintillation point counting or sieve analysis. The whole rock clay content of the reservoir rock may be in the range from about 2 weight % to about 20 weight %. Analysis of the rock for each region of the oil-bearing layer of the reservoir may also include determining the mineral content of the clay fraction of the rock, in particular, clays of the smectite type (such as montmorillonite), pyrophyllite type, kaolinite type, illite type, chlorite type and glauconite type, which can be determined by X-ray diffraction (XRD) or scanning electron microscopy (SEM) analysis. The optimal salinities (and compositions) for the blended low salinity injection waters for each region of the reservoir may be determined from correlations of formation damage occurring with different salinity boundary values (and different concentrations of individual ions or types of individual ions) for the injection water for a range of rock samples with different clay contents and clay compositions and selecting boundary values for the salinity (or composition) of the blended low salinity injection water for a rock sample that most closely matches the composition of the rock (i.e. using historical data) for each region of the reservoir that is to be subjected to the low salinity waterflood. Alternatively, experiments may be performed on samples of the rock taken from the regions of the reservoir where the injection wells have been drilled using different boundary values for the salinity and composition (concentrations of individual ions or types of individual ions) for the blended low salinity injection water to determine an optimal envelope for the salinity and composition for the injection waters to be injected into each region of the reservoir during the low salinity waterflood.

Typically, the injection capacity for the first, second and any further blended low salinity injection waters (or the single blended low salinity injection water) is limited owing to the limited capacity of the desalination plant. Accordingly, the low salinity waterflood may be designed to inject a low pore volume (PV) slug of the blended low salinity injection water into the injection well(s) penetrating the oil-bearing layer of each region of the reservoir in an amount of at least 0.3 pore volumes, preferably, at least 0.4 pore volumes as slugs having these minimum pore volumes tend to maintain their integrity within the formation. In order to limit the amount of water injected into each region of the reservoir from the injection well(s), it is preferred that the pore volume of the blended low salinity injection water less than 1, more preferably less than or equal to 0.9 PV, most preferably, less than or equal to 0.7 PV, in particular, less than or equal to 0.6 PV, for example, less than or equal to 0.5 PV.

After injection of the low pore volume of the blended low salinity injection water into the injection well(s) penetrating a region of the reservoir, a drive water may be injected from the injection well(s) into the region of the oil-bearing layer of the reservoir to ensure that the slug of blended low salinity injection water (and hence the bank of released oil) is swept through the oil-bearing layer of the reservoir to a production well that penetrates the region of the oil bearing layer of the reservoir. In addition, the injection of the drive water may be required to maintain the pressure in the region of the reservoir. Typically, the drive water has a greater PV than the slug of aqueous displacement fluid.

Preferably, the drive water is produced water or a mixture of seawater and produced water, depending on the amount of produced water separated from the produced fluids at a production facility. The use of produced water as a drive water is advantageous owing to the restrictions on disposal of produced water into the ocean. Accordingly, following injection of the slug of low salinity injection water into the injection well(s) penetrating a region of the reservoir, the injection well(s) may be used as a produced water disposal well.

The invention will now be illustrated by reference to FIG. 1 and FIG. 2.

FIG. 1 shows an integrated system for producing a blended low salinity injection water stream for a reservoir having an oil-bearing layer with a first region 56 and a second region 56' having different rock properties. The first region 56 and the second region 56' are penetrated by at least one injection well 20 and 20' respectively and at least one production well 21 and 21' respectively. The integrated system comprises: a desalination plant comprised of a membrane block 1 for treating a feed water 2 (typically seawater); a blending system comprising various flow lines for forming a blended low salinity injection water stream of variable composition, an optional concentrate tank 50 and pump 25 for a fines stabilizing concentrate; and, a control unit 52 for controlling the operation of the desalination plant and for controlling blending of the low salinity injection water stream in the blending system. The integrated system also comprises an injection system comprising one or more injection pumps 24 and injection lines 58 and 58' for the injection wells 20 and 20' and a production facility 54 in fluid communication with production lines 28 and 28' of the production wells 21 and 21'.

The membrane block 1 has a feed pump 3, an RO array 4 and an NF array 5 (each array may be either a single or multistage array). Both the RO array and the NF array may have the same feed water (for example, SW) as shown in FIG. 1. However, it is also envisaged that RO concentrate (also referred to in the art as "retentate") from a first RO stage may be divided to form a feed stream for a second RO stage and for an NF array.

The RO array 4 comprises a plurality of RO units. The NF array 5 comprises a plurality of NF units. Typically, the number of units of the RO array and the number of units of the NF array are chosen to match the required production capacity of RO permeate and NF permeate for the blended low salinity injection water stream during the low salinity waterflood. The desalination plant may also be provided with a by-pass line 6 for the feed water 2 (for example, SW).

The integrated system has valves V1 to V8 and various flow lines (conduits) configured to provide the flow paths described below. Valves V1 to V8 may be throttle valves and the degree of opening of the throttle values may be set by the control unit (i.e. fully open position, fully closed position, or various intermediate positions). Accordingly, the control unit 52 may control the flows and pressures through the membrane block by controlling the feed pump 3, valves V1 to V5 or any combination thereof (for clarity, electrical connections between the control unit 52, the feed pump 3, and the valves V1 to V5 are omitted from FIG. 1; in some embodiments, communications between the control unit 52 and the feed pump 3 and valves V1 to V5 may comprise wireless communications, such as Wi-Fi or Bluetooth).

Flow rate sensors Q1-Q10 are provided for determining the flow rates in the various flow lines of the integrated system. Flow rate data may be sent from the flow rate sensors Q1 to Q10 to the control unit 52 via electrical signal lines (the dotted lines in FIG. 1) or through wireless communications, such as Wi-Fi or Bluetooth communications. Optionally, the flow rate sensors Q1 and Q2 on the RO concentrate and NF concentrate lines 8 and 7, respectively, may be omitted.

Ion concentration sensors S1-S7 are also provided for determining the total concentration of dissolved ions (TDS) and/or the concentration of individual ions or types of individual ions (such as multivalent cations or divalent cations) in the various flow lines. Ion concentration data are also sent from the ion concentration sensors S1-S7 to the control unit 52 via electrical signal lines (dotted lines shown in FIG. 1) or through wireless communications, such as Wi-Fi or Bluetooth communications. Optionally, the sensors S4 and S6 on the NF concentrate and RO concentrate lines 7 and 8, respectively, may be omitted. The sensor S6 on the optional fines stabilizer concentrate feed line 26 may also be omitted if the concentration of the additive in the concentrate tank has previously been measured and remains stable over time (in which case, the measured concentration of additive in the concentrate may be inputted into the control unit 52). It is also envisaged that the sensors S1, S2, and S3 on the optional SW by-pass line 6, on the RO permeate feed line 9, and on the NF permeate feed line 13, respectively, may be omitted when the compositions of the SW, RO permeate and NF permeate are predicted to remain substantially constant over time.

In the configuration of FIG. 1, feed pump 3 pumps feed water 2 to the RO array 4 where the feed water is separated into an RO permeate (that flows through RO permeate feed line 9) and an RO concentrate (that flows through RO concentrate line 8) and to the NF array 5 where the feed water is separated into an NF permeate (that flows through NF permeate feed line 13) and NF concentrate (that flows through NF concentrate line 7). The pressures of the feed water to the RO and NF arrays may be adjusted (for example, using a booster pump for the RO feed or a pressure let down valve for the NF feed) to match the operating pressures of the RO units of the RO array 4 and the NF units of the NF array 5 (NF units are typically operated at a lower pressure than RO units). Optionally, the feed pump 3 pumps a portion of the feed water (for example, SW) through the by-pass line 6 to the blending system. Valves V1 and V2 are at least partially open to provide a bleed of RO concentrate and NF concentrate, respectively, from the desalination plant. Typically, the RO concentrate and NF concentrate bleed streams are discharged to a body of water (e.g. the sea)

via lines 8 and 7, respectively. The NF permeate may then be injected into the RO permeate in the blending system to form a combined RO/NF permeate stream that flows through line 16. Optionally, the combined RO/NF permeate stream also includes SW and/or a fines stabilizing concentrate (added via feed lines 6 and/or 26, respectively).

The fluids produced from the production wells 21 and 21' are passed to the production facility 54 via production lines 28 and 28' which may optionally connect to a main production line (not shown). The produced fluids are separated in the production facility 54 into an oil stream, gaseous stream and produced water (PW) stream.

As discussed above, boundary values and preferred boundary values for the composition of the blended low salinity injection water stream (for example, boundary values and preferred boundary values for the TDS content, concentrations of one or more individual ions, concentrations of types of individual ions, concentration ratios of individual ions, concentration ratios of types of individual ions or the concentrations of one or more fines stabilizing additives in the blended low salinity injection water) are inputted into the control unit thereby defining operating envelopes and one or more preferred operating envelopes for compositions of the blended low salinity injection waters for achieving EOR from the first or second regions of the oil-bearing layer 23 of the reservoir whilst providing different levels of assurance against the risk of formation damage in the first or second regions of the oil-bearing layer 23. Where there is a risk of souring or scaling of the reservoir, the operating envelopes and preferred operating envelopes for the compositions of the blended low salinity injection water stream also mitigate the risk of souring or scaling of the reservoir. The operating envelopes and preferred operating envelopes for the composition of the blended low salinity injection water for the first and second regions of the reservoir are independent of each other as the risk of formation damage is dependent upon the different compositions of the reservoir rock in the first and second regions of the reservoir.

Typically, different compositions for the blended low salinity injection water (TDS, concentrations of one or more individual ions, concentrations of types of individual ions, concentration ratios of individual ions, concentration ratios of types of individual ions or concentrations of one or more fines stabilizing additives) are correlated with different blend ratios for the combined RO/NF permeate stream. The different compositions are also correlated with different compositions for the combined RO/NF permeate streams (including compositions for the combined RO/NF permeate streams that include SW and one or more fines stabilizing additives). These correlations may be inputted into the control unit so that the control unit may control the operation of the desalination plant to alter the blend ratios of the NF and RO permeate streams for the combined NF/RO permeate stream and the amounts of optional SW or fines stabilizing concentrate blended into the combined RO/NF permeate stream to provide a compositions for the blended low salinity injection water falling within the operating envelope, or within a preferred operating envelope for the first or second regions of the reservoir.

The system of FIG. 1 may be used to inject a low salinity injection water successively into injection wells 20 and 20' respectively (in either order). Thus, the system of FIG. 1 may be used to form a blended low salinity injection water stream for injection into injection well 20 having a composition within an operating window for the first region of the reservoir. Accordingly, valve V7 on injection line 60 is open and valve V7' on injection line 60' is closed. Following injection of the slug of the first low salinity injection water into injection well 20, the system of FIG. 1 may be used to form a blended low salinity injection water stream having a composition within an operating window for the second region of the reservoir and to inject a slug of the second low salinity injection water into injection well 20'.

The control unit may monitor pressure sensor 23 (or 23') for any increase in pressure in the injection wells 20 (or 20') adjacent the oil-bearing interval 22 in the first region 56 (or second region 56') of the reservoir. Alternatively, or in addition, the control unit may monitor the flow sensor Q9 located downstream of the injection pump(s) 24 for any decrease in flow rate. Both an increase in pressure in the injection well and a decrease in flow rate downstream of the injection pump(s) 24 may be indicative of an unacceptable decrease in injectivity arising from formation damage. Values for a maximum permitted increase in pressure in the injection well 20 (or 20') and/or values for a maximum permitted decrease in flow rate in the injection line 60 (or 60') may be inputted into the control unit (where these values are correlated with an acceptable decrease in injectivity). If the pressure in injection well 20 (or 20') adjacent the oil-bearing interval increases to a value that approaches or reaches the maximum permitted increase in pressure or the flow rate downstream of the injection pump(s) in the injection line 60 (or 60') decreases to a value that approaches or reaches the maximum permitted decrease in flow rate, the control unit may select a preferred operating envelope for the composition of the blended low salinity injection water stream that is predicted to reduce the risk of formation damage in the first region (or the second region) of the oil-bearing layer 22 of reservoir. For example, preferred operating envelopes for the compositions of the blended low salinity injection water may be defined by one or more of: higher boundary values for the TDS; higher boundary values for divalent cation content (in particular calcium cation content); or, higher boundary values for the one or more fines stabilising additives. The control unit may then control the operation of the desalination plant to adjust the composition of the combined RO/NF permeate stream 16 such that the blended low salinity injection water has a composition falling within the preferred operating envelope for the first (or second region) of the oil-bearing layer of the reservoir. For example, this may be achieved by the control unit sending instructions to: increase the amount of RO permeate dumped via the RO permeate dump line 11 by increase the degree of opening of throttle valve V4; to increase the divalent cation content of the blended low salinity injection water stream by increasing the amount of SW blended with the combined RO/NF permeate stream by increasing the degree of opening of throttle valve V5; or, to increase the amount of fines stabilizing concentrate in the blended low salinity water stream 18 by increasing the degree of opening of throttle valve V6. The control unit may monitor the impact of the change in operation of the desalination plant on the flow rate or composition of the low salinity injection water stream 18 (using flow rate sensor Q9 and sensor S7 respectively) to determine if the adjustments to the operation of the plant have resulted in the flow rate and compositions of the blended low salinity injection water falling within the preferred operating envelope for the first (or second) region of the reservoir and, if necessary, may make further adjustments to the operation of the plant to achieve compositions within a more preferred operating envelope that provides further assurance against the risk of formation damage. Thus, the system of FIG. 1 has a control unit with a feedback loop which enables the system to produce a blended low salinity injection water stream having a composition that avoids or mitigates the risk of formation damage in the first (or second) region of the oil-bearing layer of the reservoir.

After a low pore volume slug of the blended low salinity injection water has been injected into injection well 20 (or into injection well 20'), an aqueous drive fluid, for example, produced water (PW) or a blend of SW and PW is injected into injection well 20 (or 20') via line 60 (or 60') for driving the low pore volume slug and hence a bank of released oil towards the production well 21 (or 21').

The system of FIG. 1 may also be used to produce a low salinity injection water stream that is injected contemporaneously into injection wells 20 and 20'. Thus, both of valves V7 and V8 are in open positions. In this scenario, the control unit determines an overriding operating window for the composition of the low salinity injection water defined by boundary values for a region of overlap between the operating envelopes determined for the compositions of the low salinity injection waters for the first and second regions of the reservoir. The control unit also determines one or more preferred overriding operating windows for the composition of the low salinity injection water that continues to achieve EOR from the first and second regions of the reservoir whilst providing one or more improved levels of assurance against the risk of formation damage in the first and second regions of the oil-bearing layer 23. The preferred overriding operating window(s) for the composition of the low salinity injection water is defined by boundary values for a region of overlap between preferred operating envelopes for the compositions of the low salinity injection waters for the first and second regions of the reservoir. The control unit may monitor pressure sensors 23 and 23' for any increase in pressure in the injection wells 20 and 20' adjacent the oil-bearing interval 22 in the first region 56 and second region 56' of the reservoir. Alternatively, or in addition, the control unit may monitor the flow sensor Q9 located on the main injection line 59 downstream of the injection pump(s) 24 for any decrease in flow rate. An increase in pressure in either of injection wells 20 and 20' or a decrease in flow rate in the main injection line may be indicative of an unacceptable decrease in injectivity arising from formation damage. Values for a maximum permitted increase in pressure in the injection wells 20 and 20' and/or values for a maximum permitted decrease in flow rate in the main injection line 59 may be inputted into the control unit (where these values are correlated with an acceptable decrease in injectivity). If the pressure in injection well 20 and/or 20' adjacent the oil-bearing interval increases to a value that approaches or reaches the maximum permitted increase in pressure or the flow rate in the main injection line downstream of the injection pump(s) decreases to a value that approaches or reaches the maximum permitted decrease in flow rate, the control unit may select a preferred overriding operating envelope for the composition of the blended low salinity injection water stream that is predicted to reduce the risk of formation damage in the first and the second regions of the oil-bearing layer 22 of reservoir. For example, preferred overriding operating envelopes for the compositions of the blended low salinity injection water may be defined by one or more of: higher boundary values for the TDS; higher boundary values for divalent cation content (in particular calcium cation content); or, higher boundary values for the one or more fines stabilising additives. The control unit may then control the operation of the desalination plant to adjust the composition of the combined RO/NF permeate stream 16 such that the blended low salinity injection water has a composition falling within the preferred overriding operating envelope. This may be achieved as described above. Similarly, the control unit may monitor the impact of the change in operation of the desalination plant on the flow rate or composition of the low salinity injection water stream 18 (using flow rate sensor Q9 and sensor S7 respectively) to determine if the adjustments to the operation of the plant have resulted in the flow rate and compositions of the blended low salinity injection water falling within the preferred overriding operating envelope and to determine if the loss of injectivity as stabilizes and, if necessary, may make further adjustments to the operation of the plant to achieve compositions within a more preferred overriding operating envelope that provides further assurance against the risk of formation damage in the first and second regions of the reservoir.

Figure 2:
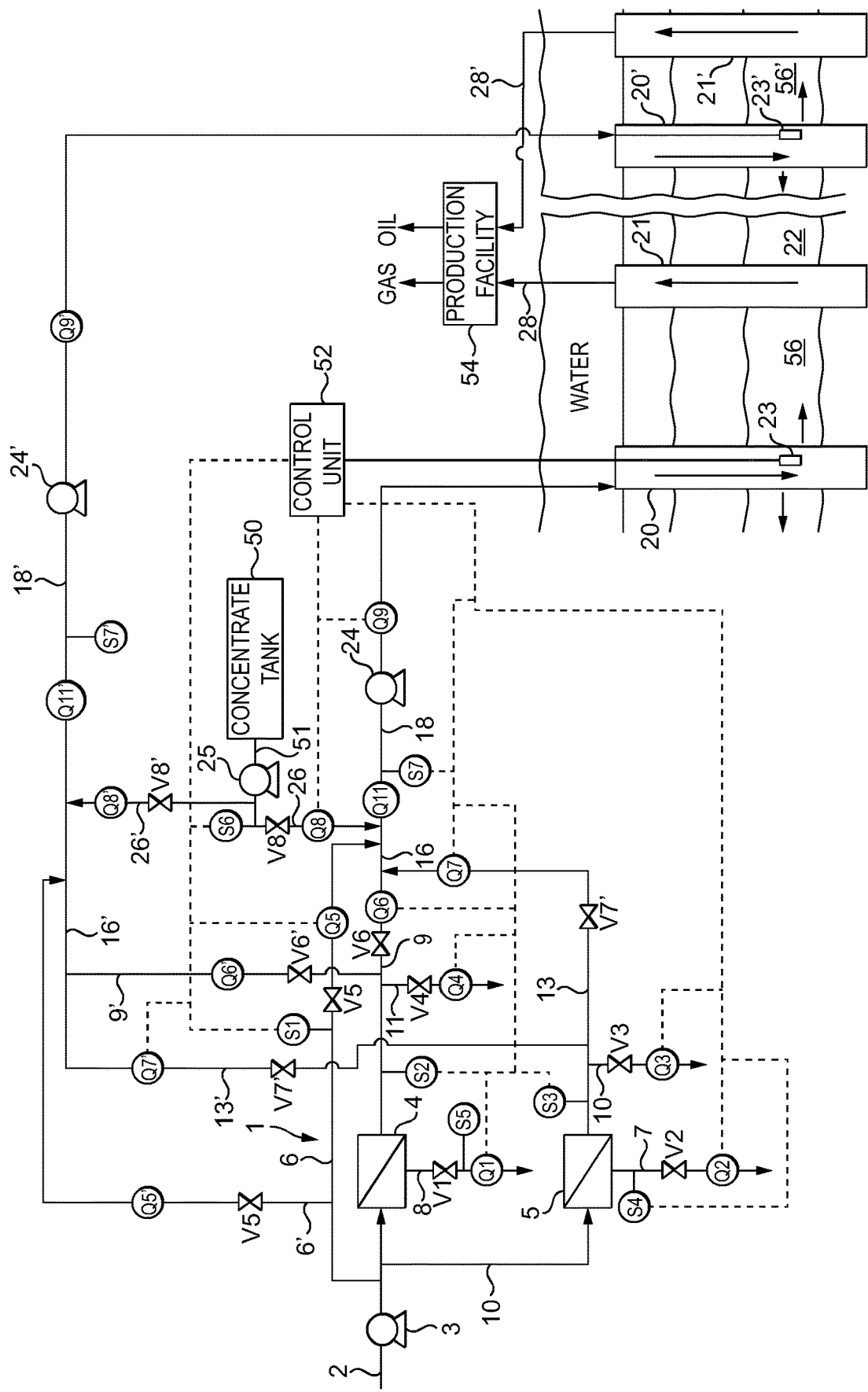

FIG. 2 shows a modified integrated system that is capable of simultaneously injecting a first low salinity injection water stream into the first region of the reservoir and a second low salinity injection water stream into the second region of the reservoir wherein the compositions of the first and second low salinity waters are different (i.e., are defined by different operating envelopes). The integrated system of FIG. 2 differs from the integrated system of FIG. 1 in that the blending system has various flow lines for forming a first and a second combined RO/NF permeate stream that flow through lines 16 and 16'; an optional concentrate tank 50 for a fines stabilizing concentrate and having a main concentrate line 51 provided with a pump and concentrate branch lines 26 and 26' each provided with an adjustable flow control valve V8 and V8' respectively that may optionally deliver fines stabilizing concentrate to the first and second combined RO/NF permeate streams respectively; an optional seawater (SW) bypass line having branch lines 6 and 6' each provided with an adjustable flow control valve V5 and V5' respectively that may optionally deliver SW to the first and second combined RO/NF permeate streams; an injection system for the injection wells 20 and 20' wherein the injection system comprises first and second dedicated injection lines 18, 18" for delivering the first and second blended low salinity injection water streams to the injection wells 20 and 20' respectively, wherein the first and second dedicated injection lines 18 and 18' are each provided with one or more injection pumps 24 and 24' respectively; and, a control unit for controlling the operation of the desalination plant and for controlling blending of the first and second low salinity injection waters in the blending system. The system also comprises a production facility in fluid communication with first and second production lines 28, 28' of the production wells 21, 21'.

The integrated system of FIG. 2 has valves V1 to V8 and V5' to V8' and various flow lines (conduits) configured to provide the flow paths described below. Valves V1 to V8 and V5' to V8' may be throttle valves and the degree of opening of the throttle valves may be set by the control unit (i.e. fully open, fully closed positions or various intermediate positions). Accordingly, the control unit may control the flows and pressures through the membrane block by controlling the feed pump 3, valves V1 to V4, valves V5 and V5', valves V6 and V6" and valves V7 and V7' or any combination thereof.

Flow rate sensors Q1 to Q9 and Q5' to Q9' are provided for determining the flow rates in the various flow lines of the integrated system. Flow rate data may be sent from the flow rate sensors Q1 to Q9 and Q5' to Q9' to the control unit via electrical signal lines (the dotted lines in FIG. 1) or through wireless communications, such as Wi-Fi or Bluetooth communications. Optionally, the flow rate sensors Q1 and Q2 on the RO concentrate and NF concentrate lines 8 and 7 respectively may be omitted.

Ion concentration sensors are also provided for determining the total concentration of dissolved ions (TDS) and/or the concentration of individual ions or types of individual ions (such as multivalent cations or divalent cations) in the NF concentrate and RO concentrate bleed streams (sensors S4 and S5), in the various blending streams (sensors S1, S2, S3 and S6) and in the first and second blended low salinity injection water streams (sensors S7 and S7" respectively). Ion concentration data are also sent to the control unit via electrical signal lines or through wireless communications, such as Wi-Fi or Bluetooth communications. Optionally, the sensors S4 and S6 on the NF concentrate and RO concentrate lines 7 and 8 respectively may be omitted. The sensor S6 on the optional fines stabilizer concentrate feed line 26 may also be omitted if the concentration of the additive in the concentrate tank has previously been measured and remains stable over time (in which case, the measured concentration of additive in the concentrate may be inputted into the control unit). It is also envisaged that the sensors S1, S2, and S3 on the optional SW by-pass branch line 6, on the RO permeate feed branch line 9, and on the NF permeate feed branch line 13 respectively may be omitted when the compositions of the SW, RO permeate and NF permeate are predicted to remain substantially constant over time.

In the configuration of FIG. 2, the RO permeate feed line 9 divides to form first and second branch RO permeate feed lines 9' and 9". Similarly, the NF permeates feed line 13 divides to form first and second branch NF permeate feed lines 13' and 13". The NF permeate flowing through the first branch NF permeate feed 13' may then be injected into the RO permeate flowing through the first branch RO feed line 9' to form a first combined RO/NF permeate stream that flows through line 16'. Similarly, the NF permeate flowing through the second branch NF permeate feed 13" may then be injected into the RO permeate flowing through the second branch RO feed line 9" to form a second combined RO/NF permeate stream that flows through line 16".

Optionally, SW and/or a fines stabilizing concentrate is added to the first combined RO/NF permeate stream flowing through line 16' and the second combined RO/NF permeate stream flowing through line 16" via lines 6, 6' and/or 26, 26' respectively). The resulting first and second blended low salinity injection waters are then injected into the injection wells 20, 20' penetrating the first and second regions respectively of the oil-bearing layer of the reservoir through injection lines 18, 18' respectively. However, it is envisaged that the NF permeate, RO permeate, optional SW and optional fines stabilizing concentrate used to form the first and second low salinity injection waters may be combined in any order, including at a single blending point for each of the first and second blended low salinity injection waters.

As discussed above, boundary values for the compositions of the first and second blended low salinity injection water are inputted into the control unit thereby defining operating envelopes for the first and second blended low salinity injection waters that achieve EOR from the first and second regions of the oil bearing layer 23 of the reservoir whilst mitigating the risk of formation damage.

The control unit may control the operation of the desalination plant to alter the blend ratios of the NF and RO permeate streams for the first and second combined NF/RO permeate streams and the amounts of optional SW or fines stabilizing concentrate blended into the first and second combined RO/NF permeate streams to provide compositions for the first and second blended low salinity injection water falling within the operating envelopes for the first and second regions of the oil-bearing layer of the reservoir respectively.

Preferred boundary values may be inputted into the control unit where the preferred boundary values define preferred operating envelopes (second, third, etc. operating envelopes) for the compositions of each of the first and second blended low salinity injection waters that may further mitigate the risk of formation damage in the first and second regions of the reservoir while maintaining acceptable EOR from the first and second regions of reservoir.

Accordingly, the control unit may monitor pressure sensors 23 and 23' for any increase in pressure in the injection wells 20, 20' adjacent the oil-bearing intervals 22, 22' or may monitor the flow sensors Q9 and Q9' located downstream of the injection pump(s) 24, 24' of the dedicated injection lines 18, 18' of the injection system for any decrease in flow rate (both of which may be indicative of an unacceptable decrease in injectivity arising from formation damage). Values for a maximum permitted increase in pressure in the injection wells 20, 20' and/or a maximum permitted decrease in flow rate in the dedicated injection lines 18, 18' may be inputted into the control unit (where these values are correlated with an acceptable decrease in injectivity). If the pressure in injection well 20 and/or 20' adjacent the oil-bearing interval increases to a value that approaches or reaches the maximum permitted increase in pressure or the flow rate downstream of the injection pump(s) in the dedicated injection lines 18 and/or 18' decreases to a value that approaches or reaches the maximum permitted decrease in flow rate, the control unit may select an alternative operating envelope for the composition of the first and/or second blended low salinity injection water (e.g. one of the second, third etc. operating envelopes), that is predicted to reduce the risk of formation damage. For example, the alternative operating envelopes for the compositions of the first and/or second blended low salinity injection waters may be defined by one or more of: higher boundary values for the TDS; higher boundary values for divalent cation content (in particular calcium cation content); or, higher boundary values for the one or more fines stabilising additives. The control unit may then alter the operation of the desalination plant of the integrated system to adjust the composition of the first and/or second blended injection waters to fall within the alternative operating envelope. For example, this may be achieved by the control unit sending instructions to the amount of RO permeate dumped via the RO permeate dump line 11. The control unit may also alter the operation of the integrated system to increase the divalent cation content of the first and/or second combined RO/NF permeate stream, by increasing the amount of SW added to the first and/or second combined RO/NF permeate stream, and/or, to increase the amount of fines stabilizing concentrate added the combined first and/or second RO/NF stream (by changing the degree of opening of one or more of throttle valves V5, V5', V8 or V8'). The control unit may monitor the impact of the change in operation of the integrated system on the flow rate on the composition of the first and/or second blended low salinity injection water streams using flow rate sensors Q9 and sensor S7 and/or flow rate sensor Q9' and sensor S7' to determine if the adjustments to the operation of the plant have resulted in the compositions of the first and second blended injection waters falling within the preferred operating envelopes and, if necessary, may make further adjustments to the operation of the plant to achieve compositions within the preferred operating envelope. The control unit may also monitor the flow rates of the first and/or second blended low salinity injection water streams in injection lines 18 and 18' downstream of the injection pumps 24 and 24' and/or the downhole pressure in injection wells 20 and 20' using pressure sensors 23 and 23' respectively to determine if the injectivity has stabilized or increase. If not, the control unit may alter the operation of the integrated system so that the composition of the first and/or second blended low salinity injection water lies within yet a further preferred operating envelope for the first and/or second regions of the reservoir. Thus, the system of FIG. 1 has a control unit with a feedback loop which enables the system to adjust the composition of the first and second blended low salinity injection water stream to mitigate the risk of formation damage whilst maintaining EOR from the reservoir.

Where a low pore volume slug of the blended first low salinity injection water (or second low salinity injection water) has been injected into injection well 20 (or 20'), it is envisaged that the dedicated injection line 18 for the injection well 20 (or the dedicated injection line 18' for injection well 20') may be used to inject produced water (PW) or a blend of SW and PW as an aqueous drive fluid for driving the low pore volume slug of blended low salinity injection water and hence a bank of released oil towards the production well 21 (or towards production well 21'). Accordingly, the RO permeate and NF permeate streams are no longer required for injection well 20 (or 20') and may be diverted for producing one or more blended low salinity injection waters for at least one injection well penetrating a further region of the reservoir.

We claim:

1. A method comprising:
   producing, with a desalination plant and blending system, a first blended low salinity injection water for injection into at least one injection well penetrating a first region of an oil-bearing reservoir;
   producing, with the desalination plant and blending system, a second blended low salinity injection water for injection into at least one injection well penetrating a second region of the oil-bearing reservoir,
   wherein the first region and the second region have a first rock composition and a second rock composition, respectively,
   wherein the first rock composition and the second rock composition have different risks of formation damage when exposed to a low salinity injection water, and
   wherein the first blended low salinity injection water and the second blended low salinity injection water each comprise variable amounts of nanofiltration permeate and reverse osmosis permeate,
   injecting the first blended low salinity injection water into the first region while maintaining a composition of the first blended low salinity injection water within a first predetermined operating envelope by adjusting the amounts of the nanofiltration permeate and the reverse osmosis permeate in the first blended low salinity injection water in response to a decrease in injectivity; and
   injecting the second blended low salinity injection water into the second region while maintaining a composition of the second blended low salinity injection water within a second predetermined operating envelope by adjusting the amounts of the nanofiltration permeate and the reverse osmosis permeate in the second low salinity injection water in response to a decrease in injectivity,
   wherein maintaining the first blended low salinity injection water within the first predetermined operating envelope and maintaining the second blended low salinity injection water within the second predetermined operating envelope comprises controlling an amount of the reverse osmosis permeate and the nanofiltration permeate available for blending in real time by changing an amount of the reverse osmosis permeate discharged from the desalination plant and blending system into a body of water via a reverse osmosis permeate dump line and an amount of nanofiltration permeate discharged from the desalination plant and blending system into the body of water via a nanofiltration permeate dump line, wherein maintaining the first blended low salinity injection water within the first predetermined operating envelope and maintaining the second blended low salinity injection water within the second predetermined operating envelope improves an enhanced oil recovery from the first region and the second region, respectively, and wherein maintaining the first blended low salinity injection water within the first predetermined operating envelope and maintaining the second blended low salinity injection water within the second predetermined operating envelope reduces formation damage upon injection of the first blended low salinity injection water into the first region and injection of the second blended low salinity injection water into the second region, respectively.

2. The method of claim 1, wherein the first blended low salinity injection water and the second blended low salinity injection water each further comprise variable amounts of seawater.

3. The method of claim 1, wherein the first blended low salinity injection water and the second blended low salinity injection water each further comprise variable amounts of a fines stabilizing additive.

4. The method of claim 1, further comprising:
   injecting the first blended low salinity injection water into the at least one injection well penetrating the first region of the oil-bearing reservoir;
   injecting the second blended low salinity injection water into the at least one injection well penetrating the second region of the oil-bearing reservoir contemporaneously.

5. The method of claim 1, further comprising:
   injecting the first blended low salinity injection water into the at least one injection well penetrating the first region of the oil-bearing reservoir;
   injecting the second blended low salinity injection water into the at least one injection well penetrating the second region of the oil-bearing reservoir, wherein the first blended low salinity injection water is injected prior to the injection of the second blended low salinity injection water.

6. The method of claim 1, wherein the oil-bearing reservoir further comprises a third region of the reservoir, wherein the third region of the oil-bearing reservoir has a different risk of formation damage when exposed to a low salinity injection water than the first region and the second region, wherein the method further comprises:
   producing a third blended low salinity injection water for injection into the at least one injection well that penetrates the third region of the oil-bearing reservoir; and
   injecting the third blended low salinity injection water into the at least one injection well penetrating the third region of the oil-bearing reservoir, maintaining a composition of the third blended low salinity injection water within a third predetermined operating envelope,
wherein the third predetermined operating envelope improves an enhanced oil recovery from the third region and reduces formation damage upon injection of the third blended low salinity injection water.

7. The method of claim 6, wherein the first blended low salinity injection water, the second blended low salinity injection water, and the third low salinity injection water are injected into the at least one injection well simultaneously.

8. The method of claim 6, wherein the first blended low salinity injection water, the second blended low salinity injection water, and the third low salinity injection water are injected into the at least one injection well sequentially.

9. The method of claim 6, wherein at least one of the first predetermined operating envelope, the second predetermined operating envelope, or the third predetermined operating envelope defines a sulfate level of less than 100 mg/L.

10. The method of claim 1, wherein the first predetermined operating envelope and the second predetermined operating envelope comprise one or more boundary values for the composition of the first blended low salinity injection water and the composition of the second blended low salinity injection water, respectively, wherein the one or more boundary values comprise an upper limit and a lower limit for parameters comprising: a total dissolved solids content, a salinity, an ionic strength, a concentration of one or more individual ions, the concentrations of one or more types of individual ions, a ratio of a type of individual ion, and a ratio of an individual ion.

11. A method comprising:
determining an overriding operating envelope for a single blended low salinity injection water, wherein the operating envelope defines boundary values for a region of overlap for a plurality of predetermined operating envelopes for compositions of the blended low salinity injection waters for a first region and a second region of an oil-bearing reservoir, wherein the plurality of predetermined operating envelopes improve enhanced oil recovery from the first region and the second region of the oil-bearing reservoir while reducing formation damage in the first region and the second region,
wherein at least one injection well penetrates the first region, and at least one injection well penetrates the second region,
wherein a reservoir rock of the first region has a first rock composition, wherein a reservoir rock of the second region has a second rock composition, wherein the first rock composition and the second rock composition have different risks of formation damage when exposed to the compositions of the blended low salinity injection waters, and wherein the single blended low salinity injection water comprises variable amounts of nanofiltration permeate and reverse osmosis permeate;
producing, with a desalination plant and blending system, the single injection fluid having a composition within the overriding operating envelope by controllably blending at least one of a reverse osmosis permeate and a nanofiltration permeate;
maintaining the composition of the single injection fluid within the overriding operating envelope by adjusting the amounts of the reverse osmosis permeate and the nanofiltration permeate in the single injection fluid in response to a decrease in injectivity, and wherein maintaining the composition of the single injection fluid within the operating envelope comprises controlling an amount of the reverse osmosis permeate or the nanofiltration permeate available for blending in real time by changing an amount of the reverse osmosis permeate discharged from the desalination plant and blending system into a body of water via a reverse osmosis permeate dump line and an amount of nanofiltration permeate discharged from the desalination plant and blending system into the body of water via a nanofiltration permeate dump line.

12. The method of claim 11, further comprising:
injecting the single injection fluid into the first region and into the second region.

13. The method of claim 11, wherein the first region and the second region are different regions or layers of reservoir rock within the oil-bearing reservoir.

14. The method of claim 11, wherein the first rock composition and the second rock composition are different.

15. The method of claim 11, wherein the boundary values of the single blended low salinity injection water comprise at least one of an upper limit or a lower limit for parameters comprising at least one of: a total dissolved solids content, a salinity, an ionic strength, a concentration of one or more individual ions, the concentrations of one or more types of individual ions, a ratio of a type of individual ion, a ratio of an individual ion, or any combination thereof.

16. A system for injecting a single blended low salinity injection water of variable composition into at least one injection well penetrating a first region of an oil-bearing reservoir and injecting the single blended low salinity injection water into at least one injection well penetrating a second region of the oil-bearing reservoir, the system comprising:
a desalination plant, wherein the desalination plant comprises:
a Reverse Osmosis (RO) array configured to produce an RO permeate blending stream and deliver the RO permeate blending stream to a blending system; and
a Nano-Filtration (NF) array configured to produce an NF permeate blending stream and deliver the NF permeate blending stream to the blending system;
a blending system, wherein the blending system comprises:
an RO permeate feed line,
an NF permeate feed line,
an RO permeate dump line configured to discharge RO permeate from the blending system into a body of water,
an NF permeate dump line configured to discharge NF permeate from the blending system into the body of water,
a blending point configured to blend the RO permeate and the NF permeate to form the single blended low salinity injection water, and
a discharge line configured to deliver the single blended low salinity injection water to the injection system; and
an injection system, wherein the injection system comprises:
an injection line having at least one injection pump configured to deliver the single blended low salinity injection water to: 1) the at least one injection well penetrating the first region of the oil-bearing reservoir, and 2) the at least one injection well penetrating the second region of the oil-bearing reservoir, and a control unit, wherein the control unit is configured to:
  adjust an amount of at least one of the RO permeate blending stream or the NF permeate blending stream that are blended at the blending point; and
  maintain the composition of the single blended low salinity injection water within an overriding operating envelope defined by boundary values for a region of overlap of a first predetermined operating envelope and a second predetermined operating envelope, wherein the first predetermined operating envelope and the second predetermined operating envelope define compositions of the single blended low salinity injection water for the first region and the second region of the oil-bearing reservoir, wherein the first predetermined operating envelope and the second predetermined operating envelope define compositions that improve oil recovery from the first region and the second region and reduce formation damage in the first region and the second region.

17. The system of claim 16, wherein the first predetermined operating envelope and the second predetermined operating envelope are stored in the control unit, and wherein the control unit is further configured to determine the overriding operating envelope using the first predetermined operating envelope and the second predetermined operating envelope.

18. The system of claim 16, wherein the blending system comprises:
  a tank comprising a concentrated aqueous solution of at least one fines stabilizing additive, and
  a fines stabilizing concentrate feed line, wherein the blending system is configured to deliver variable amounts of the at least one fines stabilizing additive to the single blended low salinity injection water through the fines stabilizing concentrate feed line.

19. The system of claim 18, wherein the blending system further comprises a metering pump configured to dose the at least one fines stabilizing concentrate into the single blended low salinity injection water.

20. The system of claim 19, wherein the metering pump is in signal communication with a flow rate meter, wherein the metering pump is configured to adjust a concentration of the at least one fines stabilizing additive in the single blended low salinity injection water to match a concentration profile for the at least one fines stabilizing additive using a signal from the flow rate meter.

21. The system of any of claim 18, wherein the control unit is further configured to:
  adjust the amount of the at least one fines stabilizing additive delivered to at least one of: 1) The blending point of the blending system, or 2) the injection line; and
  maintain the composition of the single blended low salinity water within the overriding operating envelope based on the adjustment of the amount of the at least one fines stabilizing additive.

22. The system of claim 16, wherein the overriding operating envelope comprises upper limits and lower limits for a concentration of the at least one fines stabilizing additive, wherein the upper limits and lower limits correspond to overlapping concentrations of the at least one fines stabilizing additive common to both the first and second predetermined operating envelopes.

23. The system of claim 16, wherein the desalination plant is located at an onshore location and the blending system is located at an offshore location.

24. The system of claim 16, wherein the injection system further comprises:
  a plurality of branch injection lines coupled to a single subsea manifold, wherein the injection line is connected to the single subsea manifold, and wherein the plurality of branch injection lines couple the single subsea manifold to the at least one injection well penetrating the first region of an oil-bearing reservoir and the at least one injection well penetrating the second region of the oil-bearing reservoir.

25. The system of claim 24, wherein the control unit is further configured to:
  open valves in the injection line and the single subsea manifold; and
  deliver the single blended low salinity water stream from the injection line to the at least one injection well penetrating the first region and the at least one injection well penetrating the second region in response to the opening of the valves.

26. The system of claim 24, wherein the control unit is further configured to:
  selectively open valves in the injection line and the single subsea manifold;
  deliver the single blended low salinity water stream from the injection line to the at least one injection well penetrating the first region in response to the opening of the valves;
  selectively change the valves in the injection line and the single subsea manifold after delivering the single blended low salinity water stream from the injection line to the at least one injection well penetrating the first region; and
  deliver the single blended low salinity water stream from the injection line to the at least one injection well penetrating the second region in response to selectively changing of the valves.

27. The system of claim 16, wherein the blending system further comprises: one or more sensors configured to determine a composition parameter of the single blended low salinity injection water stream.

28. The system of claim 27, wherein the composition parameter comprises: a total dissolved solids concentration, a chloride anion concentration, a bromide anion concentration, a calcium cation concentration, a magnesium cation concentration, a potassium cation concentration, a nitrate anion concentration, a sulfate anion concentration, or a flow rate of one or more of: the RO permeate blending stream, the RO permeate dump stream, the NF permeate blending stream, or the NF permeate dump stream.

29. A system for producing a first blended low salinity injection water and a second blended low salinity injection water of variable composition for injection into at least one injection well that penetrates a first region of an oil-bearing reservoir and at least one injection well that penetrates a second region of the oil-bearing reservoir, wherein a reservoir rock of the first region has a first rock composition, wherein a reservoir rock of the second region has a second rock composition, wherein the first rock composition and the second rock have different risks of formation damage, wherein the first blended low salinity injection water and the second blended low salinity water each comprise variable amounts of nanofiltration permeate and reverse osmosis permeate, wherein the system comprises:
  a desalination plant, wherein the desalination plant comprises:

a Reverse Osmosis (RO) array configured to produce an RO permeate blending stream and deliver the RO permeate blending stream to a blending system, and a Nano-Filtration (NF) array configured to produce an NF permeate blending stream and deliver the NF permeate blending stream to the blending system;

the blending system, wherein the blending system comprises:
a main RO permeate feed line,
a main NF permeate feed line,
an RO permeate dump line configured to discharge RO permeate from the blending system into a body of water,
an NF permeate dump line configured to discharge NF permeate from the blending system into the body of water,
a first blending point and a second blending point, and
a first discharge line and a second discharge line, wherein the RO permeate dump line and the NF permeate dump lines are in fluid communication with the main RO permeate feed line, wherein the main RO permeate feed line is divided to form a first branch RO permeate line and a second branch RO permeate feed line configured to deliver the RO permeate blending stream to the first blending point and the second blending point, respectively, wherein the main NF permeate feed line is divided to form a first branch NF permeate feed line and a second branch NF permeate feed line configured to deliver the NF permeate blending stream to the first blending point and the second blending point, respectively, where the first discharge line and the second discharge line are in fluid communication with the first blending point and the second blending point, and where the first discharge line and the second discharge line are configured to deliver the first blended low salinity injection water and the second blended low salinity injection water to an injection system;
the injection system, wherein the injection system comprises: at least a first dedicated injection line and a second dedicated injection line, each having at least one injection pump, wherein the first dedicated injection line and the second dedicated injection line are in fluid communication with the first discharge line and the second discharge line of the blending system, respectively, wherein the first dedicated injection line is configured to deliver the first blended low salinity injection water to the at least one injection well that penetrates the first region of an oil-bearing reservoir, and wherein the second injection line is configured to deliver the second blended low salinity injection water to the at least one injection well that penetrate the second region of the oil-bearing reservoir; and a control unit, wherein the control unit is configured to:
receive a first predetermined operating envelope and a second predetermined operating envelope;
change an operation of the desalination plant to adjust the amount of at least one of the RO permeate blending stream or the NF permeate blending stream that are blended at the first blending point and second blending point; and
maintain compositions of the first blended low salinity water stream and the second blended low salinity water stream within the first predetermined operating envelope and the second predetermined operating envelope, respectively, based on the change to the operation of the desalination plant, wherein the first predetermined operating envelope and the second predetermined operating envelope define compositions that improve oil recovery from the first region and the second region and reduce formation damage in the first region and the second region.

30. The system of claim 29, wherein at least one of the first blended low salinity injection water or the second blended low salinity injection water comprises seawater or at least one fines stabilizing additive.

31. The system of claim 29, wherein the control unit is further configured to: inject the first blended low salinity injection water and the second blended low salinity injection water sequentially.

32. The system of claim 29, wherein the control unit is further configured to: inject the first blended low salinity injection water and the second blended low salinity injection water simultaneously.

33. The system of claim 29, wherein the blending system further comprises:
a tank comprising a concentrated aqueous solution of at least one fines stabilizing additive;
a main feed line coupled to the tank; and
a first branch feed line and a second branch feed line, wherein each of the first branch feed line and the second branch feed line have a flow control valve configured to deliver variable amounts of the at least one fines stabilizing additive as a blending stream for the first blended low salinity injection water and the second blended low salinity injection water.

34. The system of claim 33, wherein the control unit is further configured to:
change an operation of the blending system to adjust the amount of the at least one fines stabilizing additive delivered as a blending stream for the first blended low salinity injection water and the second blended low salinity injection water; and
maintain the compositions of the first blended low salinity injection water stream and the second blended low salinity injection water stream within the first predetermined operating envelope and the second predetermined operating envelope that include boundary values for at least one fines stabilizing additive.

35. The system of claim 29, wherein the blending system further comprises: one or more sensors configured to determine a composition parameter of the first blended low salinity injection water stream and the second blended low salinity injection water stream.

36. The system of claim 35, wherein the one or more sensors are configured to measure one or more parameter comprising: a total dissolved solids concentration, a chloride anion concentration, a bromide anion concentration, a calcium cation concentration, a magnesium cation concentration, a potassium cation concentration, a nitrate anion concentration, a sulfate anion concentration, or a flow rate of one or more of: the RO permeate blending stream, the RO permeate dump stream, the NF permeate blending stream, or the NF permeate dump stream.

* * * * *